(12) United States Patent
Shimohira

(10) Patent No.: US 11,760,175 B2
(45) Date of Patent: Sep. 19, 2023

(54) WINDING SHADE DEVICE

(71) Applicant: ASHIMORI INDUSTRY CO., LTD., Settsu (JP)

(72) Inventor: Atsushi Shimohira, Settsu (JP)

(73) Assignee: ASHIMORI INDUSTRY CO., LTD., Settsu (JP)

( * ) Notice: Subject to any disclaimer, the term of this patent is extended or adjusted under 35 U.S.C. 154(b) by 209 days.

(21) Appl. No.: 17/293,294

(22) PCT Filed: Oct. 9, 2019

(86) PCT No.: PCT/JP2019/039764
§ 371 (c)(1),
(2) Date: May 12, 2021

(87) PCT Pub. No.: WO2020/100474
PCT Pub. Date: May 22, 2020

(65) Prior Publication Data
US 2022/0009322 A1    Jan. 13, 2022

(30) Foreign Application Priority Data

Nov. 16, 2018 (JP) ................................ 2018-215690

(51) Int. Cl.
*B60J 3/02* (2006.01)
(52) U.S. Cl.
CPC ...................................... *B60J 3/02* (2013.01)
(58) Field of Classification Search
CPC ................. B60J 3/02; E06B 9/80; E06B 9/42
See application file for complete search history.

(56) References Cited

U.S. PATENT DOCUMENTS 5,464,052 A * 11/1995 Wieczorek ............. B60R 5/047
296/37.16
5,934,354 A * 8/1999 Price ..................... B60R 5/047
296/37.16

(Continued)

FOREIGN PATENT DOCUMENTS

CN        101824959 A     9/2010
CN        102704825 A    10/2012

(Continued)

OTHER PUBLICATIONS

International Search Report dated Dec. 3, 2019 issued by the International Searching Authority in counterpart International Application No. PCT/JP2019/039764 (PCT/ISA/210).

(Continued)

*Primary Examiner* — Beth A Stephan
(74) *Attorney, Agent, or Firm* — Sughrue Mion, PLLC

(57) ABSTRACT

A winding shade device includes a sheet-form member, a winding shaft for winding the sheet-form member, and a support member that is secured to a hinge door and that rotatably supports the winding shaft. The support member has a plurality of elastically deforming parts that push on and rotatably support the outer periphery of the winding shaft, which is passed through a through-hole. The plurality of elastically deforming parts have a plurality of first elastically deforming parts which are arranged along a closing direction with respect to the hinge door from the center of the winding shaft, and which are arranged in line symmetry with respect to a line passing through the center of the through-hole and extending in the opening and closing direction of the hinge door.

6 Claims, 8 Drawing Sheets

(56) References Cited

U.S. PATENT DOCUMENTS

| | | | | |
|---|---|---|---|---|
| 7,874,343 B2* | 1/2011 | Hansen | ............... | B60J 1/208 |
| | | | | 160/370.22 |
| 8,302,655 B2* | 11/2012 | Lin | ............... | F03G 1/00 |
| | | | | 160/315 |
| 8,869,870 B2* | 10/2014 | Wieczorek | ............ | B60J 1/2013 |
| | | | | 160/31 |
| 9,452,663 B2* | 9/2016 | Watanabe | ............... | E06B 9/62 |
| 2005/0206334 A1 | 9/2005 | Cavarec et al. | | |
| 2005/0257903 A1* | 11/2005 | Schimko | ............... | B60J 1/208 |
| | | | | 160/370.22 |
| 2011/0209837 A1* | 9/2011 | Wieczorek | ............ | B60J 1/2013 |
| | | | | 160/370.22 |
| 2015/0300087 A1 | 10/2015 | Watanabe et al. | | |
| 2016/0137037 A1* | 5/2016 | Watanabe | ............ | B60J 1/2038 |
| | | | | 160/370.22 |
| 2018/0134131 A1 | 5/2018 | Kugler et al. | | |

FOREIGN PATENT DOCUMENTS

| | | |
|---|---|---|
| CN | 106255796 A | 12/2016 |
| CN | 107580562 A | 1/2018 |
| EP | 1 717 409 A2 | 11/2006 |
| JP | 2014-145171 A | 8/2014 |
| JP | 2014-181481 A | 9/2014 |
| JP | 2015-42505 A | 3/2015 |
| WO | 2015/174827 A1 | 11/2015 |

OTHER PUBLICATIONS

International Written Opinion dated Dec. 3, 2019 issued by the International Searching Authority in counterpart International Application No. PCT/JP2019/039764 (PCT/ISA/237).

Office Action dated Jun. 20, 2023, issued by the China National Intellectual Property Administration in counterpart Chinese Patent Application No. 201980074809.X.

* cited by examiner

CLOSING DIRECTION ⟷ OPENING DIRECTION

CLOSING ←→ OPENING
DIRECTION     DIRECTION

WINDING SHADE DEVICE

CROSS-REFERENCE TO RELATED APPLICATIONS

This application is a National Stage of International Application No. PCT/JP2019/039764 filed Oct. 9, 2019, claiming priority based on Japanese Patent Application No. 2018-215690, filed Nov. 16, 2018, the contents of all of which are incorporated herein by reference in their entirety.

TECHNICAL FIELD

The present invention relates to a winding shade device mounted on a vehicle such as an automobile.

BACKGROUND ART

Patent Literature 1 discloses a configuration of a winding shade device including: a winding tube; bearings respectively housed in both end portions of the winding tube and each having a penetrating portion; and deformable rings respectively attached inside the winding tube and around the penetrating portions of the bearings. The rings include, at end portions thereof: at least two bosses; and at least two legs extending from the bosses and having free end portions directed inward. In Patent Literature 1, when the penetrating portion of the respective bearing is disposed in the respective ring, the free end portion of the leg of the ring is in contact with the penetrating portion of the bearing, and the boss of the ring is in contact with the winding tube.

CITATION LIST

Patent Literature

Patent Literature 1: European Patent Application Publication No. 1717409

SUMMARY OF INVENTION

Technical Problem

However, in the technology described in Patent Literature 1, since the rings may not rotate together with rotation of the winding tube accompanying deployment and storage of the shade, positions of the free end portions of the legs of the rings in a circumferential direction is not fixed upon deployment and storage of the shade. Therefore, when a large impact is applied to the shade device from a certain direction when a hinge door is closed, a gap may be generated between the rings and the bearings depending on the positions of the free ends of the legs of the rings, which generates unusual sounds.

Accordingly, an object of the present invention is to provide a technology capable of reducing generation of unusual sounds from being produced in a winding shade device even when a large impact is applied from a certain direction when a hinge door is closed.

Solution to Problem

A first aspect of the present invention is a winding shade device attached to a hinge door of a vehicle, including: a sheet-form member; a winding shaft having an outer peripheral portion to which one end of the sheet-form member is attached, the winding shaft being configured to be biased in a direction in which the sheet-form member is wound; and a support member configured to be fixed to the hinge door, the support member including: a wall portion formed with a through-hole through which an end portion of the outer peripheral portion of the winding shaft passes; and a plurality of elastically deformed parts extending inwardly from an inner peripheral surface of the through-hole, the plurality of elastically deformed parts pressing and rotatably supporting the end portion of the winding shaft passed through the through-hole, in which the plurality of elastically deformed parts include a plurality of first elastically deformed parts disposed in a closing direction of the hinge door relative to a center of the winding shaft, the plurality of first elastically deformed parts being disposed in line symmetry with respect to a line that passes through a center of the through-hole and that extends in an opening and closing direction of the hinge door.

A second aspect is the winding shade device according to the first aspect, in which the plurality of elastically deformed parts further include at least one second elastically deformed part disposed in an opening direction of the hinge door relative to the center of the winding shaft.

A third aspect is the winding shade device according to the second aspect, in which a movement amount of the winding shaft by which the winding shaft, which is to move under inertia upon an end of a closing operation of the hinge door, moves under inertia while elastically deforming the first elastically deformed parts in the closing direction is smaller than a deformation amount of the second elastically deformed part in the opening direction in a stationary state due to the winding shaft passing through the through-hole.

A fourth aspect is the winding shade device according to the second or third aspect, in which a deformation amount of the second elastically deformed part in the opening direction in a stationary state due to the winding shaft passing through the through-hole is larger than a deformation amount of the first elastically deformed parts in the closing direction in the stationary state due to the winding shaft passing through the through-hole.

A fifth aspect is the winding shade device according to any one of the second to fourth aspects, in which the plurality of elastically deformed parts consists of two first elastically deformed parts and one second elastically deformed part.

A sixth aspect is the winding shade device according to any one of the first to fifth aspects, in which the elastically deformed parts are each formed in a bowstring shape connecting two different points in a circumferential direction on the inner peripheral surface of the through-hole.

A seventh aspect is the winding shade device according to any one of the first to sixth aspects, in which a mark for assembling the elastically deformed parts in a fixed posture is provided on an outer surface of the support member.

Advantageous Effects of Invention

According to the winding shade device of the first aspect, since the elastically deformed parts are formed on the support member fixed to the hinge door, the elastically deformed parts can be located at fixed positions with respect to the hinge door in a state where the winding shade device is attached to the hinge door. As a result, when a large impact load is applied upon the end of the closing operation of the hinge door and the winding shaft is to move under inertia in the closing direction of the hinge door, the first elastically deformed parts can always receive the winding shaft at a fixed position. Further, the plurality of first elastically deformed parts can receive a force of inertial movement of the winding shaft in the closing direction of the hinge door in a distributed manner. Accordingly, in the winding shade device, even when a large impact is applied from a certain direction when the hinge door is closed, the movement amount of the winding shaft can be reduced by the elastically deformed part, and thus generation of unusual sounds can be reduced.

According to the second aspect, upon the end of the closing operation of the hinge door, the second elastically deformed part follows the winding shaft after inertial movement, so that a gap is less likely to be formed between the winding shaft and the second elastically deformed part, which can further reduce generation of unusual sounds.

According to the third aspect, upon the end of the closing operation of the hinge door, there is no gap between the winding shaft after inertial movement and the second elastically deformed part and it is possible to further reduce generation of unusual sounds.

According to the fourth aspect, upon the end of the closing operation of the hinge door, even if the movement amount of the winding shaft after inertial movement is large, the second elastically deformed part can easily follow the winding shaft to the end.

According to the fifth aspect, an increase in the number of elastically deformed parts can be prevented, and the shape of the elastically deformed parts can be simplified.

According to the sixth aspect, the elastically deformed parts each have a bowstring shape, and thus can be formed smaller than the through-hole, which reduces the size of the support member which rotatably supports the winding shaft.

According to the seventh aspect, since the fixed posture of the elastically deformed parts is always constant, it is easy to dispose each of the elastically deformed parts at a fixed position with respect to the hinge door.

DESCRIPTION OF EMBODIMENTS

Embodiment

Figure 1:
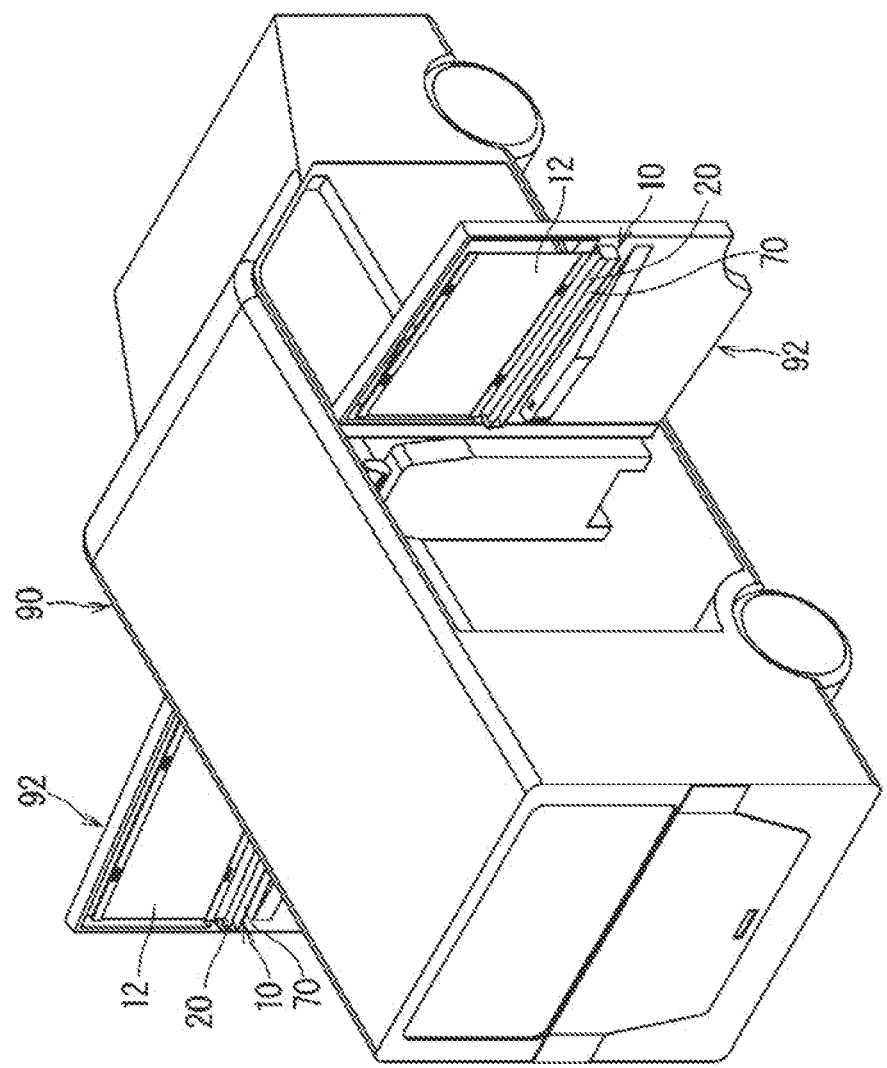
FIG. 1 is an explanatory view illustrating a state in which a winding shade device according to an embodiment is attached to a vehicle.
Figure 2:
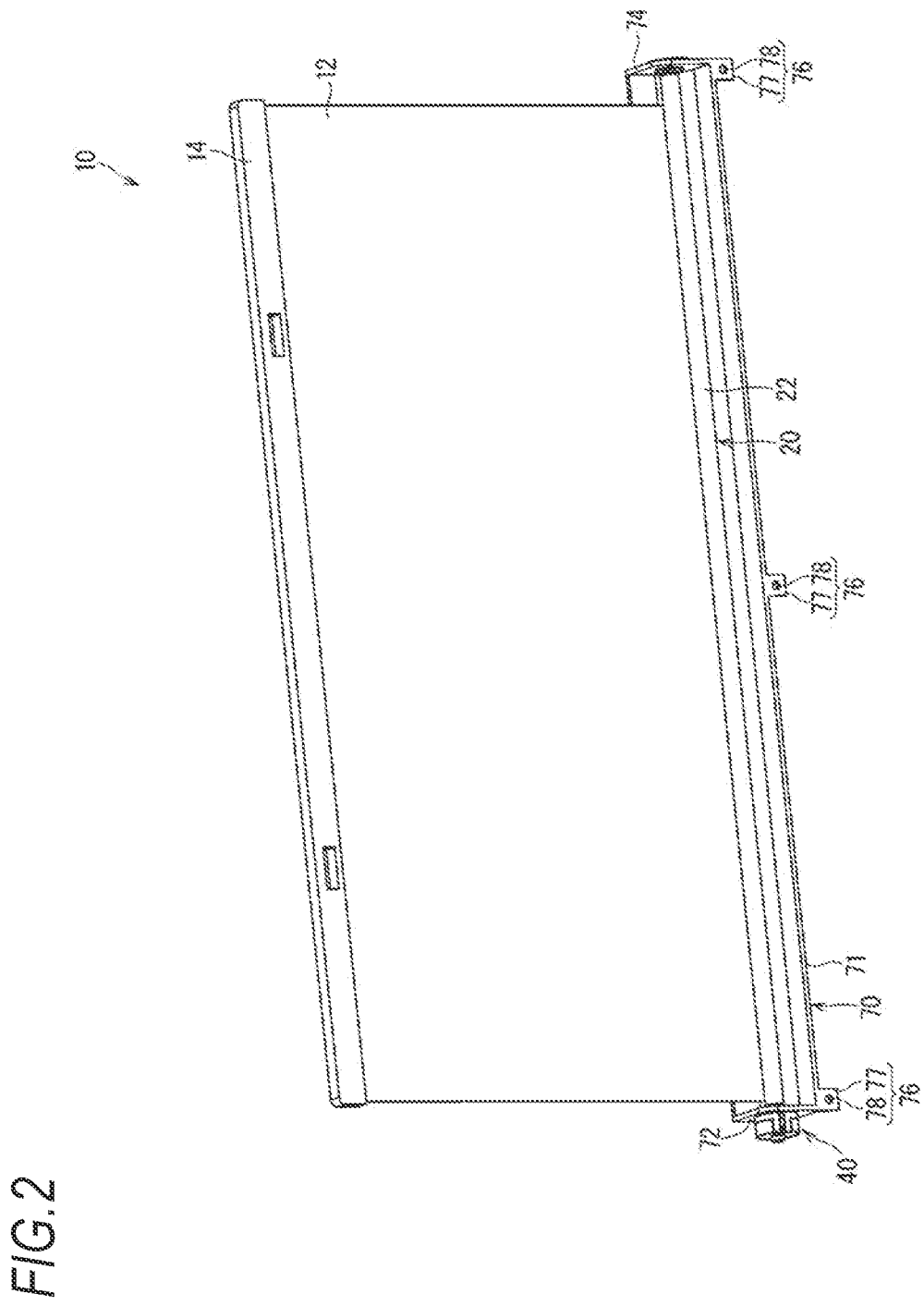
FIG. 2 is a perspective view illustrating the winding shade device according to the embodiment.
Figure 3:
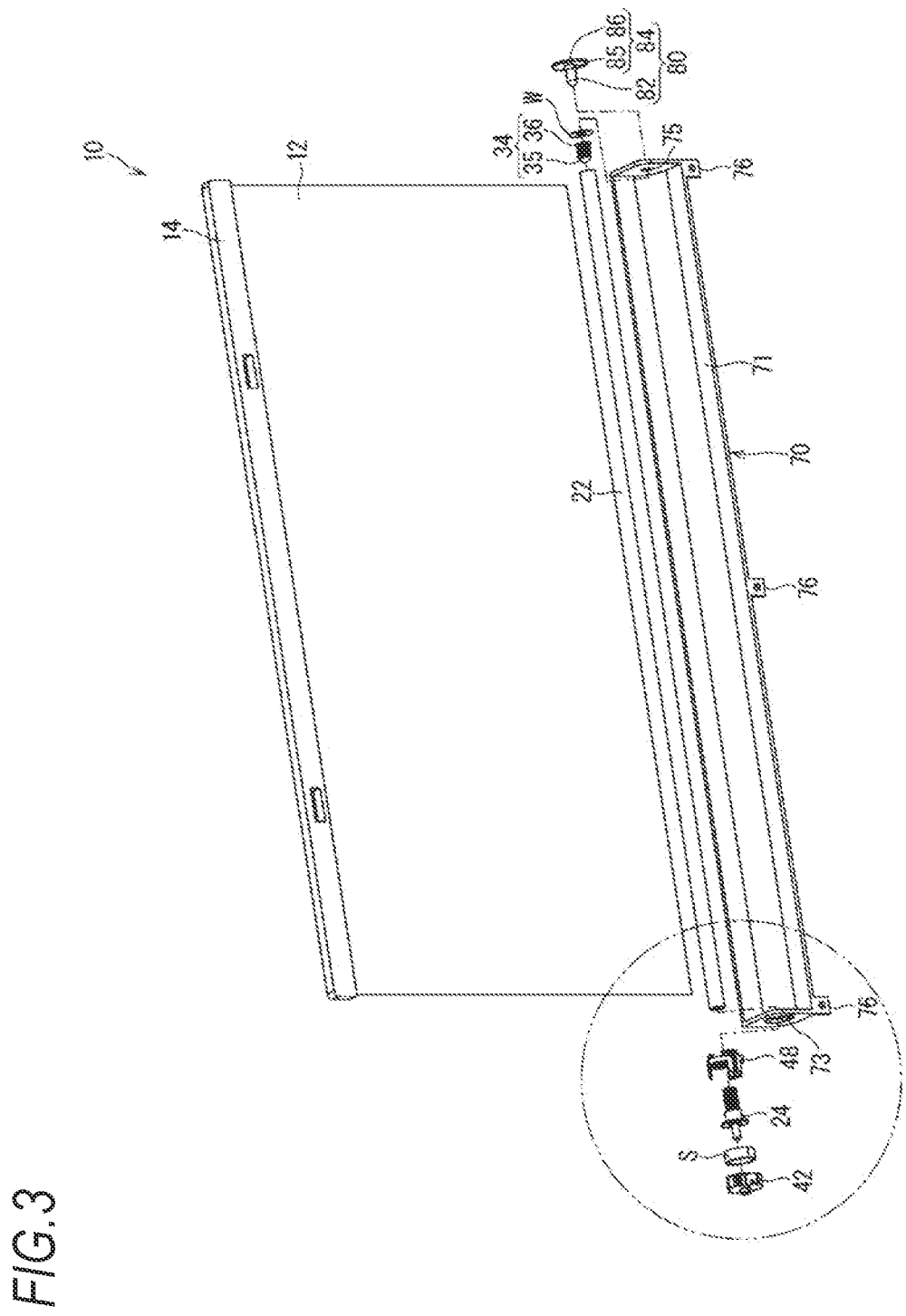
FIG. 3 is an exploded perspective view illustrating the winding shade device according to the embodiment.
Figure 4:
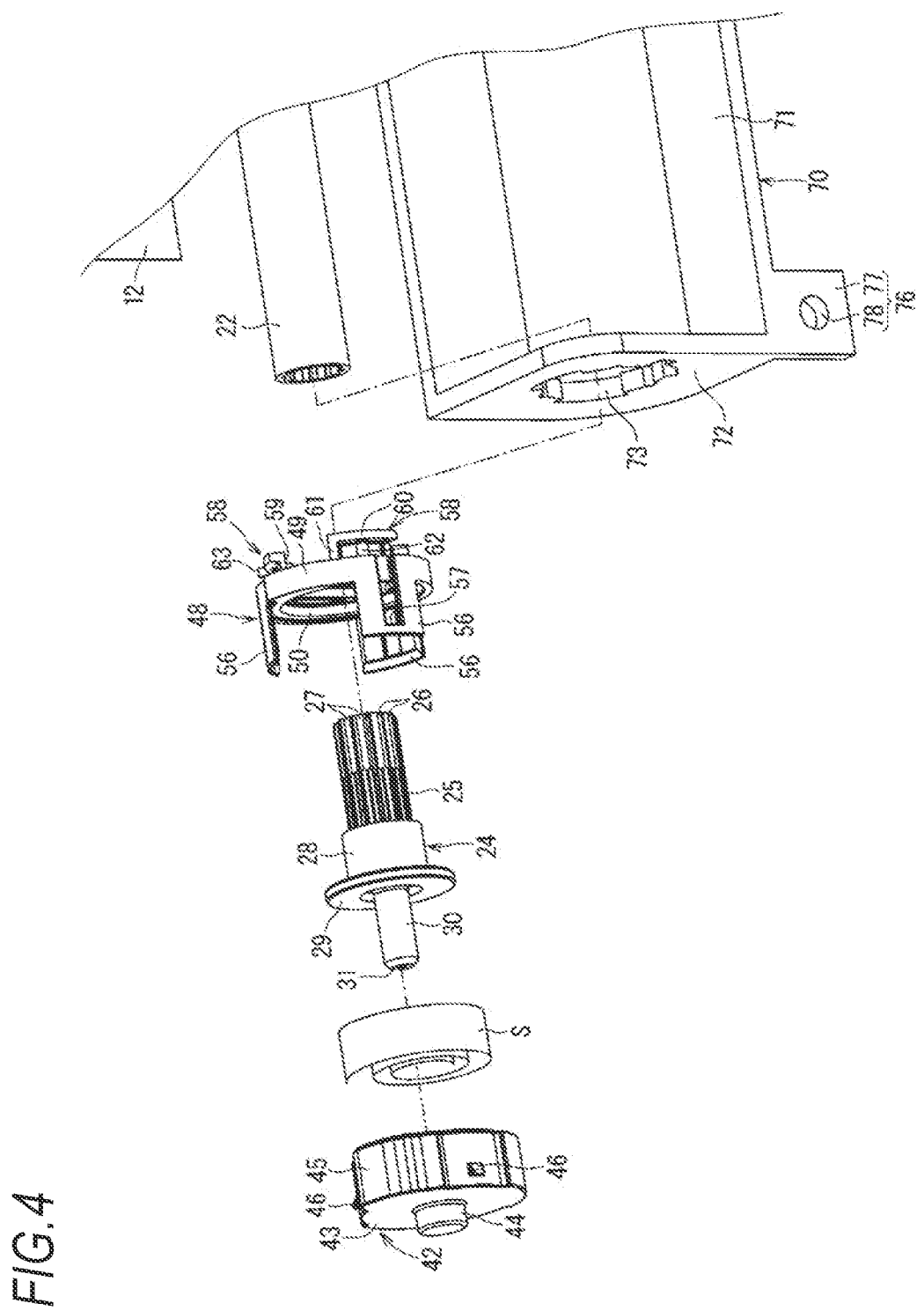
FIG. 4 is an enlarged view of a part of FIG. 3.
Figure 5:
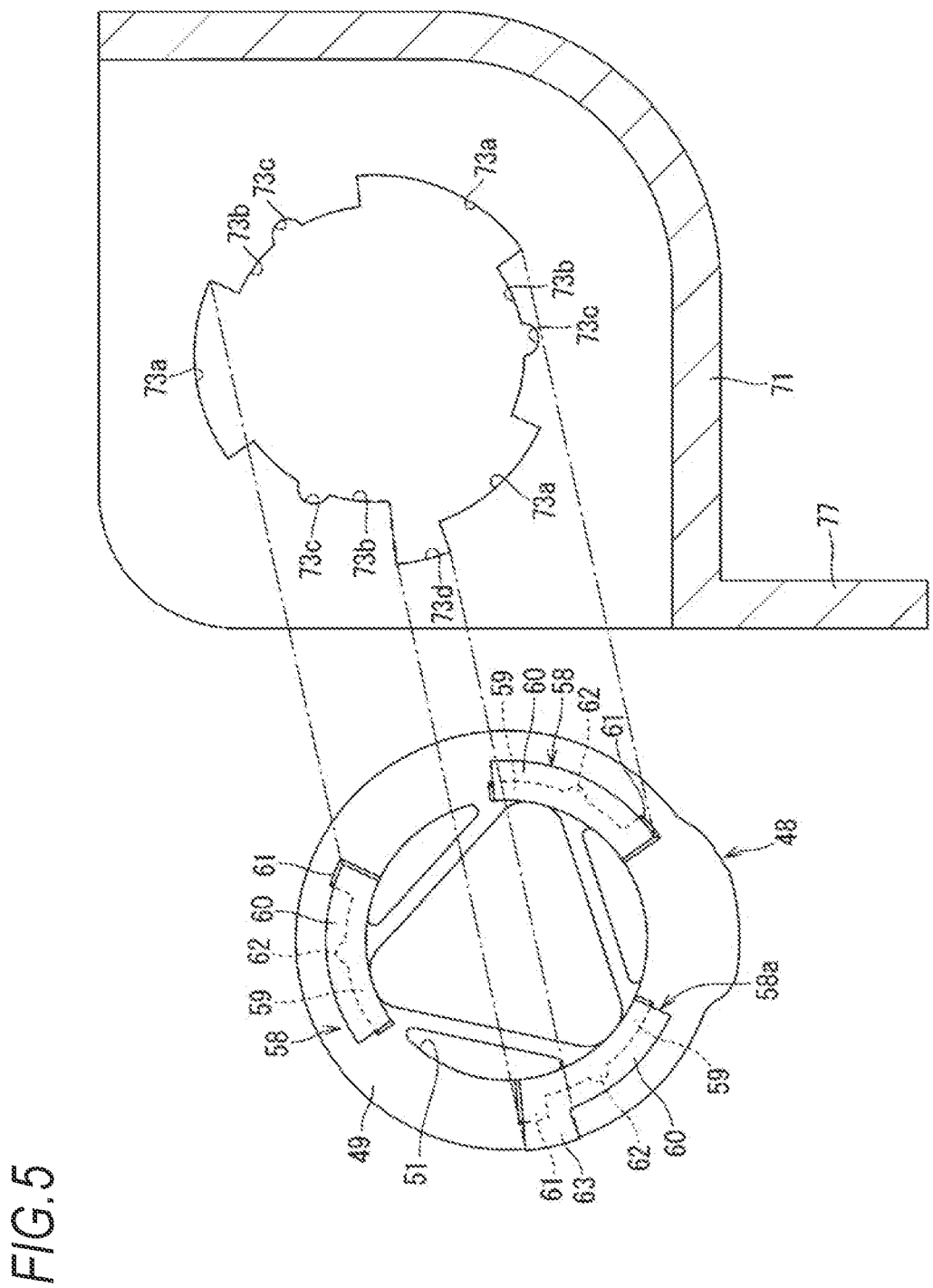
FIG. 5 is a side view of a part of FIG. 4.
Figure 6:
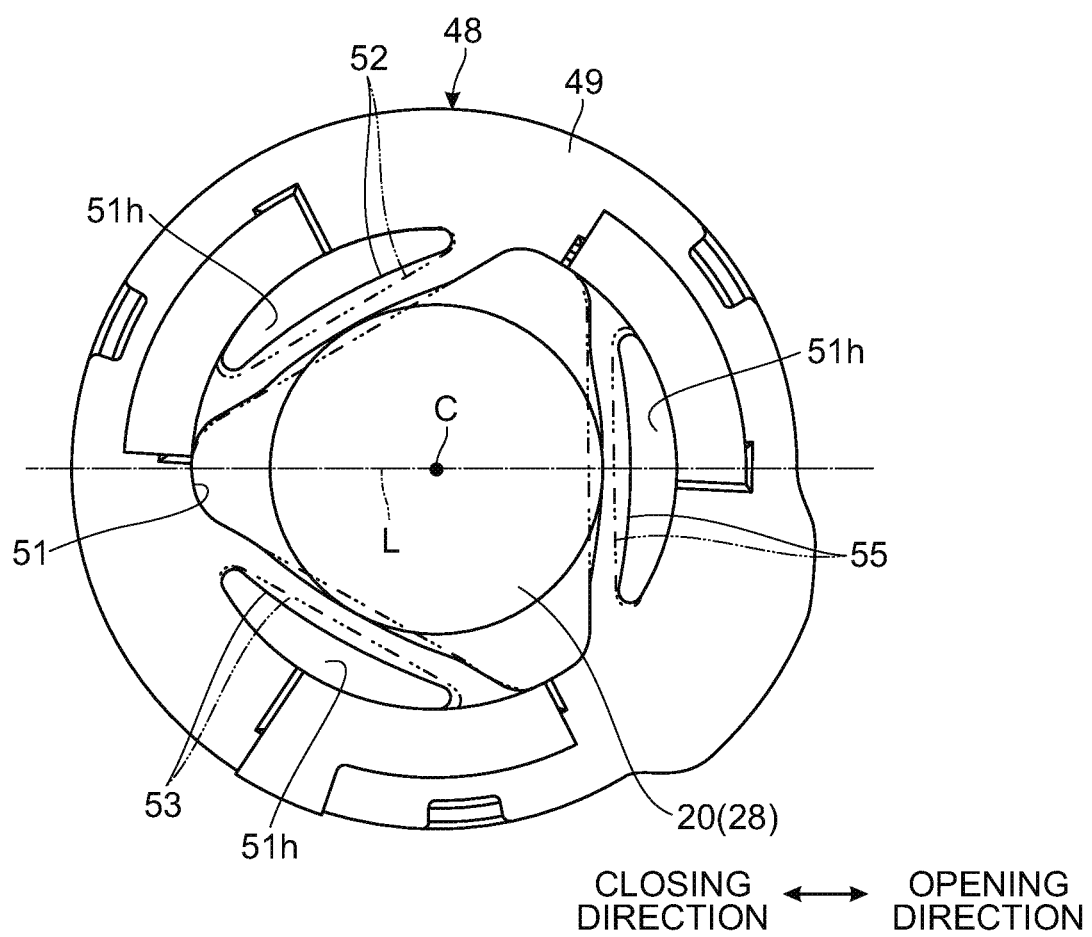
FIG. 6 is an explanatory view illustrating a state of a winding shaft and a support member when a hinge door is in a stationary state.

Hereinafter, a winding shade device according to an embodiment will be described. FIG. 1 is an explanatory view illustrating a state in which a winding shade device 10 according to an embodiment is attached to a vehicle 90. FIG. 2 is a perspective view illustrating the winding shade device 10 according to the embodiment. FIG. 3 is an exploded perspective view illustrating the winding shade device 10 according to the embodiment. FIG. 4 is an enlarged view of a part of FIG. 3. FIG. 5 is a side view of a part of FIG. 4. FIG. 6 is an explanatory view illustrating a winding shaft 20 and a support member 40 when a hinge door 92 is in a stationary state. The two-dot chain line in FIG. 6 indicates a state of elastically deformed parts 52, 53, and 55 before the winding shaft 20 is inserted.

The winding shade device 10 is attached to the hinge door 92 of the vehicle 90, and a longitudinal direction of the winding shade device 10 is provided along a vehicle front-rear direction. The winding shade device 10 is a device that winds a sheet-form member 12 for shielding a window of the vehicle 90 in a manner capable of drawing and storing the sheet-form member 12. In the example illustrated in FIG. 1, the winding shade device 10 is attached to the hinge door 92 for a rear seat of the vehicle 90, but may also be attached to a hinge door provided at another position. Further, in the example illustrated in FIG. 1, the winding shade device 10 is attached to the hinge door 92 whose rotation axis extends along a vertical direction (an upper-lower direction of the vehicle 90), but may also be attached to a hinge door whose rotation axis extends in another direction.

The winding shade device 10 includes the sheet-form member 12, the winding shaft 20, and the support member 40. Here, the winding shade device 10 further includes a biasing member S, a frame 70, and a rotation support member 80.

The sheet-form member 12 is a flexible sheet-form member formed by performing cutting, sewing, or the like on a cloth material, a mesh-shaped cloth material, a resin sheet, or the like. The sheet-form member 12 is formed to have a shape and a size corresponding to an application, here, a shape and a size capable of partially or entirely shielding the window. A rod-shaped drawing member 14 for drawing operation may be provided at a drawing-side end portion of the sheet-form member 12.

The winding shaft 20 is a member for winding the sheet-form member 12. One end edge portion of the sheet-form member 12 is attached to an outer peripheral portion of the winding shaft 20. The winding shaft 20 is biased by the biasing member S in a direction in which the sheet-form member 12 is wound. Here, the winding shaft 20 includes a shaft main body 22 and bearings 24 and 34 respectively attached to end portions of the shaft main body 22. Here, an example in which the bearing 24 is provided at an end portion on the door hinge side among both end portions in the longitudinal direction of the shaft main body 22 and the bearing 34 is provided at an end portion on the opposite side thereto will be described, but the bearings 24 and 34 may be attached in an opposite arrangement.

The shaft main body 22 is formed in an elongated cylindrical shape, for example. The one end edge portion of the sheet-form member 12 is attached to an outer peripheral portion of the shaft main body 22.

The bearing 24 is attached to an end portion of the shaft main body 22 in the longitudinal direction. The bearing 24 is formed in a shape including a fitting portion 25, a penetrating portion 28, a flange portion 29, and a biasing member attachment portion 30. For example, the bearing 24 is an integrally molded product formed by injection molding or the like.

The fitting portion 25 is a portion to be fitted into the shaft main body 22 from an end opening of the shaft main body 22. The fitting portion 25 is fitted into the shaft main body 22, and is fixed to the shaft main body 22 in a manner such that the fitting portion 25 and the shaft main body 22 cannot rotate relative to each other about an axis of the shaft main body 22. The fitting portion 25 is formed, for example, in a shape in which a plurality of recesses are arranged in a circumferential direction on an outer peripheral portion of a cylindrical member. That is, the outer peripheral portion of the fitting portion 25 is formed in a shape in which protrusions 26 protruding in a radial direction and recesses 27 recessed in the radial direction are alternately arranged in the circumferential direction. For example, the inner peripheral portion of the end portion of the shaft main body 22 also has an uneven shape corresponding to the outer peripheral portion of the fitting portion 25. The fitting portion 25 is fixed to the shaft main body 22 so as not to be relatively rotatable about the axis of the shaft main body 22 due to the uneven shape of the outer peripheral portion of the fitting portion 25 and the uneven shape of the inner peripheral portion of the shaft main body 22. In addition, for example, an outer diameter of the protrusions 26 is set larger than an inner diameter of the shaft main body 22, and the fitting portion 25 is press-fitted into the shaft main body 22, whereby the fitting portion 25 is fixed to the shaft main body 22 so as not to be relatively rotatable about the axis of the shaft main body 22.

The penetrating portion 28 is a portion that is rotatably supported in a state of passing through a through-hole of a wall portion formed in the support member 40. The penetrating portion 28 is continuous with an axial end portion of the fitting portion 25. The penetrating portion 28 is formed in, for example, a cylindrical shape, and is formed in a shape protruding to the outer peripheral side with respect to the fitting portion 25. The penetrating portion 28 has an outer diameter set larger than the inner diameter of the shaft main body 22 so as not to be inserted into the shaft main body 22. That is, in a state where the fitting portion 25 is fitted into the inside of the shaft main body 22, the penetrating portion 28 comes into contact with an end surface of the shaft main body 22 in the axial direction and is prevented the fitting portion 25 from being further inserted.

The flange portion 29 is a portion housed in the support member 40. The flange portion 29 is a portion for preventing movement in the axial direction in a state where the bearing 24 is supported by the support member 40. The flange portion 29 is formed in, for example, a disk shape, and is formed in a shape protruding from the outer peripheral portion of the axial end portion of the penetrating portion 28 to the outer peripheral side.

The biasing member attachment portion 30 is a portion to which the biasing member S is attached. The biasing member attachment portion 30 is formed in a shape corresponding to the biasing member S. Here, since a spiral spring is provided as the biasing member S, the biasing member attachment portion 30 is formed such that an end portion (here, an end portion on the inner peripheral side) of the spiral spring can be attached. The biasing member attachment portion 30 is continuous with an axial end portion of the penetrating portion 28. The biasing member attachment portion 30 is formed, for example, in a columnar shape having a smaller diameter than the penetrating portion 28, and is formed in a shape in which a groove 31 extending toward the inner peripheral side is formed in an outer peripheral portion thereof. The groove 31 reaches an end surface on the free end portion side of the biasing member attachment portion 30, and an end portion on the inner peripheral side of the spiral spring is inserted and supported therein.

The bearing 34 is attached to the other end portion of the shaft main body 22 in the longitudinal direction. Here, the bearing 34 is formed in a bearing shape having a cylindrical inner peripheral surface. The bearing 34 has a fitting portion 35 fitted into the shaft main body 22, and a flange portion 36 protruding to the outer peripheral side at one end portion of the fitting portion 35. Similarly to the fitting portion 25 of the bearing 24, the outer peripheral portion of the fitting portion 35 is formed in a shape in which protrusions and recesses are alternately arranged in the circumferential direction on the outer peripheral surface. Thus, the bearing 34 fitted into the shaft main body 22 is fixed to the shaft main body 22 so as not to be rotatable relative to the shaft main body 22 about the axis. Similarly to the penetrating portion 28, in a state where the fitting portion 35 is fitted into the inside of the shaft main body 22, the flange portion 36 comes into contact with an end surface of the shaft main body 22 in the axial direction and is prevented the fitting portion 35 from being further inserted.

The support member 40 is a member that rotatably supports an end portion of the winding shaft 20 in the longitudinal direction. The support member 40 is fixed to the hinge door 92. When the winding shade device 10 is attached to the hinge door 92 of the vehicle 90 and is in a use state, the support member 40 is fixed so as not to rotate around the axis of the winding shaft 20. Here, the support member 40 is attached to the frame 70 so as not to be rotatable relative to the frame 70 about its axis, and is fixed to the hinge door 92 via the frame 70. Hereinafter, an example in which the support member 40 is a case 40 that houses the biasing member S will be described.

The case 40 includes: a wall or lid portion 49 formed with a through-hole 51 through which an end portion of the outer peripheral portion of the winding shaft 20 passes, and a plurality of elastically deformed parts 52, 53, 55 extending inwardly from an inner peripheral surface of the through-hole 51 and pressing and rotatably supporting the end portion of the winding shaft 20 passed through the through-hole 51. Here, an example will be described in which the case 40 includes a housing member 42 and a lid member 48 that are separately molded. The wall portion 49 and the plurality of elastically deformed parts 52, 53, 55 are formed on the lid member 48. The flange portion 29 and the biasing member attachment portion 30 of the bearing 24, and the biasing member S are housed in a housing space formed by the housing member 42 and the lid member 48.

The housing member 42 includes a housing portion 43 formed in a box shape and a plurality of (here, three) locking protrusions 46 formed on an outer peripheral surface of the housing portion 43.

The housing portion 43 mainly houses the biasing member S and the biasing member attachment portion 30. In the housing portion 43, one surface along the axial direction of the winding shaft 20 is open. A recess is formed in a bottom portion of the housing portion 43 on a side opposite to the opening, and protrudes from an outer surface thereof. The recess is a tip end housing portion 44 for housing a tip end of the biasing member attachment portion 30. Since the tip end of the biasing member attachment portion 30 to which the biasing member S is attached is housed in the tip end housing portion 44, it is possible to prevent the biasing member S from being detached from the biasing member attachment portion 30 and to prevent the axes of the bearings 24 and 34 from being inclined. A part of a peripheral wall portion of the housing portion 43 protrudes outward so as to form an end housing portion 45. An outer peripheral side end portion of the spiral spring serving as the biasing member S is housed in the end housing portion 45.

The plurality of (here, three) locking protrusions 46 are formed apart from each other in the circumferential direction. The locking protrusions 46 are used for fitting with the lid member 48.

The lid member 48 includes the lid portion 49 formed in a lid shape that closes an opening of the housing portion 43 of the housing member 42, a plurality of (here, three) first leg portions 56 that protrude from an outer peripheral surface of the lid portion 49 toward the housing member 42 along the axial direction of the winding shaft 20, and a plurality of (here, three) second leg portions 58 that protrude from the outer surface of the lid portion 49 toward a side opposite to the housing member 42 along the axial direction of the winding shaft 20.

A depression 50 that houses the flange portion 29 is formed on a surface on the housing member 42 side of the lid portion 49. The depression 50 is formed in a circular shape having the same diameter as the flange portion 29. A bottom portion of the depression 50 is formed with the through-hole 51 for allowing the penetrating portion 28 to pass therethrough. Therefore, here, the lid portion 49 functions as a wall portion 49, and the plurality of elastically deformed parts 52, 53, and 55 are formed on the inner peripheral surface of the through-hole 51.

The through-hole 51 is formed in a circular shape having a larger diameter than the penetrating portion 28 so that the penetrating portion 28 can be inserted through. The through-hole 51 is formed to have a smaller diameter than the flange portion 29 and the depression 50. Therefore, a peripheral edge portion of the through-hole 51, which is the bottom portion of the depression 50, comes into contact with the flange portion 29, thereby preventing the bearing 24 from coming off.

The plurality of elastically deformed parts 52, 53, 55 include a plurality of first elastically deformed parts 52, 53 disposed in a closing direction of the hinge door 92 relative to the center C of the winding shaft 20. Further, here, the plurality of elastically deformed parts 52, 53, 55 include at least one second elastically deformed part 55 disposed in an opening direction of the hinge door 92 relative to the center C of the winding shaft 20. Here, an example in which the plurality of elastically deformed parts 52, 53, and 55 include two first elastically deformed parts 52 and 53 and one second elastically deformed part 55 will be described.

The first elastically deformed parts 52 and 53 are in contact with the outer peripheral surface of the winding shaft 20 from the closing direction with respect to the hinge door 92 relative to the center C of the winding shaft 20. Accordingly, when the winding shaft 20 is to move in the closing direction, the first elastically deformed parts 52 and 53 receive the winding shaft 20. Here, it is assumed that the center C of the winding shaft 20 and the center C of the through-hole 51 coincide with each other in the stationary state. Of course, the center C of the winding shaft 20 and the center C of the through-hole 51 may not coincide with each other in the stationary state.

In addition, the plurality of (here, two) first elastically deformed parts 52 and 53 are arranged in line symmetry with respect to a line L that passes through the center C of the through-hole 51 and that extends in the opening and closing direction of the hinge door 92. Accordingly, the winding shaft 20 is supported by the first elastically deformed parts 52 and 53 from both sides with respect to the line L that passes through the center C of the through-hole 51 and that extends in the opening and closing direction of the hinge door 92. In particular, here, the plurality of (here, two) first elastically deformed parts 52 and 53 are arranged in line symmetry with respect to the line L that passes through the center C of the through-hole 51 and that extends in the opening and closing direction of the hinge door 92. As a result, the elastic forces received by the winding shaft 20 from the plurality of (here, two) first elastically deformed parts 52 and 53 are substantially equal.

The second elastically deformed part 55 is in contact with the winding shaft 20 from the opening direction side of the hinge door 92 relative to the center C of the winding shaft 20. Accordingly, when the winding shaft 20 is to move in the opening direction, the second elastically deformed part 55 bears the winding shaft 20.

As described above, here, one second elastically deformed part 55 is provided. The one second elastically deformed part 55 is in contact with the winding shaft 20 at a portion intersecting with the line L that passes through the center C of the through-hole 51 and that extends in the opening and closing direction of the hinge door 92.

The first elastically deformed parts 52 and 53 are elastically deformed in the closing direction by the winding shaft 20 in the stationary state. Therefore, in the stationary state, the winding shaft 20 is received an elastic force from the first elastically deformed parts 52 and 53 toward the center C of the winding shaft 20. The elastic force applied to the center C of the winding shaft 20 from the first elastically deformed parts 52 and 53 includes a component applied in the opening direction. Moreover, the second elastically deformed part 55 is elastically deformed in the opening direction by the winding shaft 20 in the stationary state. Therefore, in the stationary state, the winding shaft 20 is received an elastic force from the second elastically deformed part 55 toward the center C of the winding shaft 20. The elastic force applied to the center C of the winding shaft 20 from the second elastically deformed part 55 includes a component applied in the closing direction.

Here, the elastically deformed parts 52, 53, and 55 are each formed in a bowstring shape connecting two different points in the circumferential direction on the inner peripheral surface of the through-hole 51. In particular, here, the two first elastically deformed parts 52 and 53 and the one second elastically deformed part 55 are all formed in the bowstring shape. The two first elastically deformed parts 52 and 53 and the one second elastically deformed part 55 are arranged so as to constitute portions of different sides of an equilateral triangle that is larger than the through-hole 51 in a state before the winding shaft 20 passes through (a state indicated by a two-dot chain line in FIG. 6). Thus, the two first elastically deformed parts 52 and 53 and the one second elastically deformed part 55 are independent from each other without intersecting with each other on the inner peripheral surface of the through-hole 51.

Of course, the two first elastically deformed parts 52 and 53 and the one second elastically deformed part 55 may be arranged in a different manner. For example, the two first elastically deformed parts and the one second elastically deformed part may be arranged in an isosceles triangle shape other than equilateral triangle with the one second elastically deformed part as a part of the base. Further, for example, the two first elastically deformed parts and the one second elastically deformed part may partially form different sides of an equilateral triangle smaller than an equilateral triangle inscribed in the through-hole 51. In this case, the two first elastically deformed parts and the one second elastically deformed part intersect with each other inside the through-hole 51. As in this case, the bowstring-shaped elastically deformed parts may intersect with each other inside the through-hole 51.

The two first elastically deformed parts 52 and 53 and the one second elastically deformed part 55 are elastically deformed due to penetration of the winding shaft 20 (here, the penetration portion 28), and intermediate portions thereof are bent outward radial directions of the through-hole 51 in a stationary state after the winding shaft 20 passes through (a state shown by a solid line in FIG. 6). Therefore, in the stationary state, the winding shaft 20 is in a state of receiving an elastic force toward the center C of the winding shaft 20 from each of the two first elastically deformed parts 52 and 53 and the one second elastically deformed part 55. As a result, the position of the axis of the winding shaft 20 in the stationary state is stabilized.

Here, the two first elastically deformed parts 52 and 53 and the one second elastically deformed part 55 are all formed into the same size, and gap spaces 51h are formed between the intermediate portions of the two first elastically deformed parts 52 and 53 and the inner peripheral surface of the through-hole 51 and between the intermediate portion of the one second elastically deformed part 55 and the inner peripheral surface of the through-hole 51. Thus, the two first elastically deformed parts 52 and 53 and the one second elastically deformed part 55 are formed so as to have the same deformation amount in the stationary state. Of course, the plurality of elastically deformed parts may include one having different a deformation amount in the stationary state.

The plurality of elastically deformed parts 52, 53, and 55 cannot rotate around the axis with respect to the hinge door 92 in a state where the winding shade device 10 is attached to the hinge door 92. Here, since the plurality of elastically deformed parts 52, 53, and 55 are members integrally molded with the case 40 (here, the lid member 48) and the case 40 is fixed to the hinge door 92 so as not to rotate, the plurality of elastically deformed parts 52, 53, and 55 cannot rotate around the axis with respect to the hinge door 92 in the state where the winding shade device 10 is attached to the hinge door 92.

The plurality of (here, three) first leg portions 56 are formed apart from each other in the circumferential direction on the outer peripheral surface of the lid portion 49, and are formed at positions corresponding to the locking protrusions 46 of the housing member 42. The first leg portion 56 of the lid member 48 is formed with locking recesses 57 into which the locking protrusions 46 of the housing member 42 are fitted. Therefore, the housing member 42 and the lid member 48 are members to be fitted to each other.

The plurality of (here, three) second leg portions 58 are formed on the outer surface of the lid portion 49 opposite to the housing member 42 so as to be separated from each other in the circumferential direction around the center of the through-hole 51. The second leg portions 58 are portions for fixing the case 40 to the frame 70. The second leg portions 58 each include: a protruding piece 59 that protrudes in the axial direction from the outer surface of the lid portion 49 opposite to the housing member 42; a first overhang portion 60 that overhangs toward the outer peripheral side from a tip end of the protruding piece 59; a second overhang portion 61 that overhangs toward the outer peripheral side from one peripheral side portion of the protruding piece 59; and a protruding portion 62 that is formed on the outer peripheral surface of an intermediate portion of the protruding piece 59. Further, a second leg portion 58a, which is one of the second leg portions 58, includes a third overhang portion 63 that overhangs further toward the outer peripheral side from a part of the first overhang portion 60. Details of each portion of the second leg portion 58 will be described later.

The frame 70 is a member for attaching the winding shade device 10 to the hinge door 92. Specifically, the frame 70 includes: a frame main body 71 that covers a lateral side of the shaft main body 22; a first shaft support portion 72 that is formed at one end portion of the frame main body 71 in the longitudinal direction; a second shaft support portion 74 that is formed at the other end portion of the frame main body 71 in the longitudinal direction; and a door attachment portion 76 used for attachment to the hinge door 92.

Here, the frame main body 71 is formed in a shape having a cross section of an L shape continuous in the axial direction of the winding shaft 20. Therefore, the frame main body 71 covers the shaft main body 22 from two directions.

The first shaft support portion 72 is a portion that supports one end portion of the winding shaft 20. Here, the case 40 is attached to the first shaft support portion 72 so as not to rotate. Here, a support hole 73 formed in a shape corresponding to the second leg portions 58 protruding from the outer surface of the lid portion 49 of the lid member 48 is formed in an end surface of one end portion of the frame main body 71 in the longitudinal direction, and serves as the first shaft support portion 72. Here, after the second leg portions 58 are inserted into the support hole 73, the case 40 rotates around the axis of the winding shaft 20, whereby the second leg portions 58 are attached to the first shaft support portion 72 so as not to rotate.

More specifically, an inner peripheral surface of the support hole 73 has first portions 73a that are formed in a shape corresponding to the first overhang portions 60 so as to allow the first overhang portions 60 to be inserted through, and second portions 73b that have a smaller diameter than the first portions 73a. Here, since three second leg portions 58 are provided, three first portions 73a and three second portions 73b are alternately arranged in the circumferential direction. A recess 73c recessed outward in a radial direction of the support hole 73 is formed in an intermediate portion of each second portion 73b in the circumferential direction.

Attachment of the case 40 to the first shaft support portion 72 is performed, for example, as follows. That is, first, the first overhang portions 60 of the second leg portions 58 are inserted into the first portions 73a of the support hole 73. Thereafter, the insert operation is continued up to a base end side of the protruding pieces 59 beyond the first overhang portions 60 of the second leg portions 58. In this state, when the case 40 is rotated in one direction (counterclockwise in the example of FIG. 5) about the axis, outer peripheral surfaces of the protruding pieces 59 of the second leg portions 58 and inner peripheral surfaces of the second portions 73b of the support hole 73 face each other. Thereafter, the rotation operation is continued, and the protruding portions 62 formed on the outer peripheral surfaces of the protruding pieces 59 are fitted into the recesses 73c formed in the second portions 73b. Further rotation of the case 40 is prevented by stepped portions between the first portions 73a and the second portions 73b of the peripheral edge portion of the support hole 73 coming into contact with inner surfaces of the second overhang portions 61. As a result, the case 40 is attached to the first shaft support portion 72 so as not to rotate.

When the case 40 is to rotate in the other direction (clockwise in the example of FIG. 5) around the axis in a state in which the case 40 is inserted into the first portions 73a to reach the base ends of the protruding pieces 59 beyond the first overhang portions 60 of the second leg portions 58, rotation of the case 40 in this direction is prevented by stepped portions between the first portions 73a and the second portions 73b of the peripheral edge portion of the support hole 73 coming into contact with outer surfaces of the second overhang portions 61. Therefore, the support hole 73 is formed in a shape that allows the second leg portions 58 to rotate only in one direction (counterclockwise in the example of FIG. 5) around the axis after the second leg portions 58 are inserted.

The second shaft support portion 74 is a portion that supports the other end portion of the winding shaft 20. Here, the other end portion of the winding shaft 20 is rotatably supported by the second shaft support portion 74 via the rotation support member 80. Here, a support hole 75 is formed in an end surface of the other end portion of the frame main body 71 in the longitudinal direction, and the rotation support member 80 that rotatably supports the other end portion of the winding shaft 20 is inserted and attached into the support hole 75 so as not to rotate.

The rotation support member 80 supports the bearing 34 in a manner relatively rotatable about the axis of the shaft main body 22, and is attached to the second shaft support portion 74 so as not to rotate. Here, the rotation support member 80 includes a support portion 82 that supports the bearing 34 in a manner relatively rotatable, and a frame attachment portion 84 that is attached to the second shaft support portion 74 so as not to rotate.

The support portion 82 is formed in a shaft shape including a columnar outer peripheral surface, and is inserted into the bearing 34. Here, the outer diameter of the support portion 82 is set smaller (here, slightly smaller) than an inner diameter of the bearing 34. Thus, the support portion 82 rotatably supports the bearing 34. As shown in FIG. 3, a washer W may be attached to the support portion 82. The washer W is interposed, for example, between the bearing 34 and the frame 70 along the axial direction.

The frame attachment portion 84 includes an attachment main body 85 that is fitted into the support hole 75 formed in the second shaft support portion 74, and a retaining portion 86 that prevents the attachment main body 85 from coming off.

The attachment main body 85 is axially continuous with an end portion of the support portion 82. Here, an outer peripheral surface of the attachment main body 85 and an inner peripheral surface of the support hole 75 are formed in circular shapes. The attachment main body 85 is formed equal to or larger (slightly larger in this case) than the support hole 75. When the attachment main body 85 is fitted into the support hole 75, it is prevented from rotating around the axis due to a frictional force between the attachment main body 85 and the inner peripheral surface of the support hole 75. Of course, the outer peripheral surface of the attachment main body 85 and the inner peripheral surface of the support hole 75 may be formed in a shape other than the circular shape, such as a rectangular shape.

The retaining portion 86 is formed so as to overhang toward the outer peripheral side from an axial end portion of the attachment main body 85. The retaining portion 86 is formed larger than the support hole 75.

In the above example, the bearing 34 and the rotation support member 80 are relatively rotatable about the axis, and the rotation support member 80 and the frame 70 are not relatively rotatable about the axis, but the present disclosure is not limited thereto. The bearing 34 and the rotation support member 80 may be not relatively rotatable about the axis, and the rotation support member 80 and the frame 70 may be relatively rotatable about the axis.

Here, the bearing 34 does not include the penetrating portion 28 and the elastically deformed parts 52, 53, and 55, whereas the bearing 34 may include the penetrating portion 28 and the elastically deformed parts 52, 53, and 55. In this case, the case 40 may as well be attached to the other end portion of the winding shaft 20.

Returning to the description of the frame 70, the door attachment portion 76 includes three extension pieces 77 extending from both end portions and an intermediate portion of the frame main body 71. An attachment hole 78 is formed in each of the three extension pieces 77. The winding shade device 10 is attached to the hinge door 92 by, for example, screwing to the hinge door 92 or fixing to the hinge door 92 by rivets using the attachment holes 78. Of course, the winding shade device 10 may be attached to the hinge door 92 in an attachment mode other than an attachment mode by the attachment holes 78. For example, a locking piece may be formed as the door attachment portion, and the attachment may be performed by engaging the locking piece with the hinge door 92.

Further, here, marks for assembling the elastically deformed parts 52, 53, and 55 in a predetermined posture is provided on an outer surface of the case 40. Here, a first mark and a second mark are formed as the marks.

The first mark is the third overhang portion 63 formed in the first overhang portion 60 of one second leg portion 58 of the lid member 48 such that a part of one circumferential end portion thereof overhangs toward the outer peripheral side. An overhang hole portion 73d through which the third overhang portion 63 can be inserted is formed in one first portion 73a of the support hole 73 of the first shaft support portion 72 of the frame 70. As a result, the second leg portion 58 on which the second mark is formed can be inserted only into the specific first portion 73a (the first portion 73a on which the overhang hole portion 73d is formed) of the support hole 73, and thus a posture of the case 40 around the axis when the case 40 is inserted into the support hole 73 becomes a fixed posture. After the second leg portions 58 are inserted into the support hole 73, the case 40 is rotatable only in one direction around the axis (counterclockwise in the example of FIG. 5) as described above, and thus the attachment posture of the case 40 to the first shaft support portion 72 becomes a fixed posture, whereby the posture of the elastically deformed parts 52, 53, and 55 formed on the case becomes a fixed posture. That is, the first mark functions as a mark capable of restricting the posture of the elastically deformed parts 52, 53, and 55 during assembly into a fixed posture.

The second mark is the end housing portion 45 formed by a part of the housing portion 43 of the housing member 42 overhanging to the outer peripheral side and a portion corresponding to the end housing portion 45 of the lid portion 49 of the lid member 48. Accordingly, in the assembled state, it is possible to easily confirm whether or not the elastically deformed part is attached in a fixed posture by visually checking or touching the second mark. That is, the second mark functions as a visual mark.

However, a mark for assembling the elastically deformed parts 52, 53, and 55 in a predetermined posture may not be formed. In addition, even if the mark is formed, it is not necessary to form both the first mark and the second mark, and only one of the first mark and the second mark may be formed. Further, a mark other than the first mark and the second mark may be formed alone or additionally.

<Operation>

Figure 7:
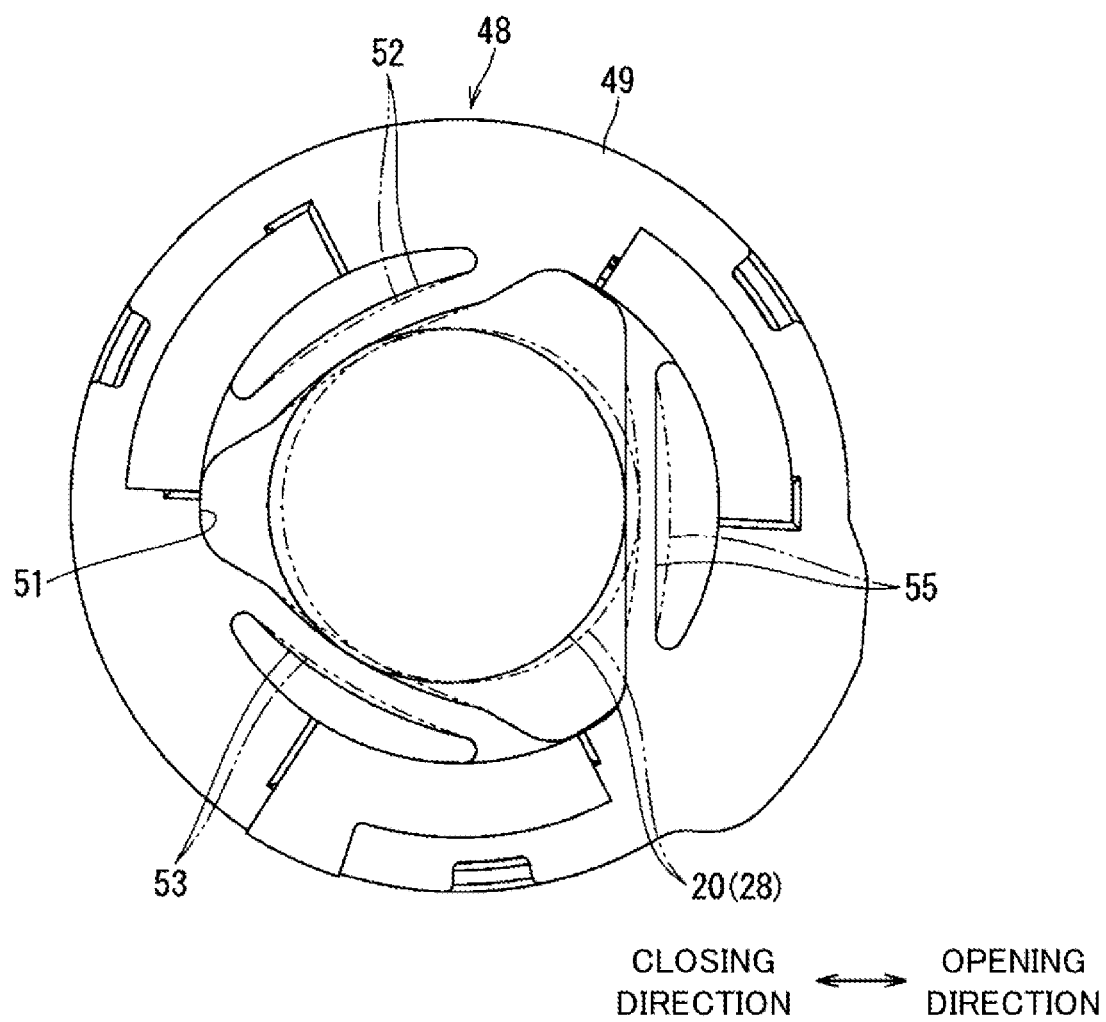
FIG. 7 is an explanatory view illustrating a state of the winding shaft and the support member upon an end of a closing operation of the hinge door.

Hereinafter, with reference to FIG. 7 in addition to FIG. 6, an operation of the winding shade device 10 upon an end of the door closing operation will be described. FIG. 7 is an explanatory view illustrating a state of the winding shaft 20 and the case 40 upon the end of the closing operation of the hinge door 92. In FIG. 7, a two-dot chain line indicates a state of the elastically deformed parts 52, 53, and 55 when the hinge door 92 is in the stationary state.

When the hinge door 92 in the open state is to be closed, the winding shade device 10 is moved together with the hinge door 92 in the closing direction of the hinge door 92 with respect to the vehicle 90. When the hinge door 92 is stopped in the closed state, a large inertial force in the closing direction is applied to the winding shade device 10. The inertial force causes the winding shaft 20 to move in the closing direction with respect to the case 40.

Here, in general, when a gap is generated between the winding shaft 20 moved in the closing direction and a support piece located on the opening direction side (the piece located at the position of the second elastically deformed part 55), during transition to the stationary state after an end of the inertial movement, there is a possibility that the winding shaft 20 and the support piece positioned on the opening direction side (the piece located at the position of the second elastically deformed part 55) come into contact with each other and generate a contact noise. In addition, it is considered that the contact noise increases as the gap between the winding shaft 20 and the support piece located on the opening direction side (the piece located at the position of the second elastically deformed part 55) is enlarged.

On the other hand, in the present embodiment, the elastically deformed parts 52, 53, and 55 are provided to reduce the contact noise.

More specifically, in the present embodiment, upon an end of the closing operation of the hinge door 92, the winding shaft 20 is moved under inertia in the closing direction while elastically deforming the first elastically deformed parts 52 and 53 as shown in FIG. 7.

At this time, since the elastically deformed parts 52, 53 and 55 are formed on the inner peripheral surface of the through-hole 51 of the case 40 fixed to the hinge door 92, the elastically deformed parts 52, 53 and 55 can be positioned at fixed positions with respect to the hinge door 92 in a state where the winding shade device 10 is attached to the hinge door 92. As a result, when the winding shaft 20 is to move under inertia in the closing direction of the hinge door 92 upon the end of the closing operation of the hinge door 92, the first elastically deformed parts 52, 53 can always receive the winding shaft 20 at a fixed position. Further, the plurality of first elastically deformed parts 52, 53 can receive a force of inertial movement of the winding shaft 20 in the closing direction of the hinge door 92 in a distributed manner. As a result, the inertial movement amount of the winding shaft 20 can be reduced, and thus the gap between the second elastically deformed part 55 and the winding shaft 20 can be reduced. As a result, the contact noise can be reduced.

Further, at this time, in view of the second elastically deformed part 55, the load applied to the second elastically deformed part 55 becomes smaller than that in the stationary state of the hinge door 92 due to the inertial movement of the winding shaft 20 in the closing direction. Accordingly, when the winding shaft 20 is moved under inertia in the closing direction upon the end of the closing operation of the hinge door 92, the second elastically deformed part 55 recovers elastically. Here, since the second elastically deformed part 55 is elastically deformed in the opening direction in the stationary state, the second elastically deformed part 55 recovers elastically in the closing direction and follows the winding shaft 20 during inertial movement of the winding shaft 20 upon the end of the closing operation of the hinge door 92. Therefore, the gap between the second elastically deformed part 55 and the winding shaft 20 can be further reduced.

Further, a movement amount of the winding shaft 20 by which the winding shaft 20, which is to move under inertia upon the end of the closing operation of the hinge door 92, is moved under inertia while elastically deforming the first elastically deformed parts 52, 53 in the closing direction is set smaller than a deformation amount of the second elastically deformed part 55 in the opening direction in the stationary state due to the winding shaft 20 passing through the through-hole 51. Thereby, the second elastically deformed part 55 can follow the winding shaft 20 to the end while recovering elastically during inertial movement of the winding shaft 20 upon the end of the closing operation of the hinge door 92. Accordingly, the gap between the second elastically deformed part 55 and the winding shaft 20 is less likely occurred.

The movement amount by which the winding shaft 20, which is to move under inertia upon the end of the closing operation of the hinge door 92, is moved under inertia while elastically deforming the first elastically deformed parts 52, 53 in the closing direction refers to an inertial movement amount of the winding shaft 20 when an assumed maximum load upon the end of the closing operation of the hinge door 92 is applied.

According to the winding shade device 10 as described above, since the elastically deformed parts 52, 53 and 55 are formed on the case 40 fixed to the hinge door 92, the elastically deformed parts 52, 53 and 55 can be positioned at fixed positions with respect to the hinge door 92 in the state where the winding shade device 10 is attached to the hinge door 92. As a result, when a large impact load is applied and the winding shaft 20 is to move under inertia in the closing direction of the hinge door 92 upon the end of the closing operation of the hinge door 92, the first elastically deformed parts 52, 53 can always bear the winding shaft 20 at a fixed position. Further, the plurality of first elastically deformed parts 52, 53 can bear a force of inertial movement of the winding shaft 20 in the closing direction of the hinge door 92 in a distributed manner. Accordingly, in the winding shade device 10, even when a large impact is applied from a certain direction when the hinge door 92 is closed, the movement amount of the winding shaft 20 can be reduced by the elastically deformed parts 52, 53 and 55, and thus generation of unusual sounds can be reduced.

Furthermore, since the plurality of first elastically deformed parts 52 and 53 bear the load of the winding shaft 20 after inertial movement in a dispersed manner, it is possible to improve durability of the first elastically deformed parts 52 and 53.

In addition, since the second elastically deformed part 55 is provided, the second elastically deformed part 55 follows the winding shaft 20 after inertial movement upon the end of the closing operation of the hinge door 92. As a result, a gap is less likely to be formed between the winding shaft 20 and the second elastically deformed part 55, which further reduces generation of unusual sounds.

Further, the movement amount by which the winding shaft 20, which is to move under inertia upon the end of the closing operation of the hinge door 92, moves under inertia while elastically deforming the first elastically deformed parts 52, 53 in the closing direction is smaller than the deformation amount of the second elastically deformed part 55 in the opening direction in the stationary state due to the winding shaft 20 passing through the through-hole 51. Thereby, upon the end of the closing operation of the hinge door 92, there is no gap between the winding shaft 20 after inertial movement and the second elastically deformed part 55, and it is possible to further reduce generation of unusual sounds.

In addition, since the plurality of elastically deformed parts 52, 53, and 55 consist of the two first elastically deformed parts 52 and 53 and the one second elastically deformed part 55, an increase in the number of the elastically deformed parts 52, 53, and 55 can be prevented, and the shape of the elastically deformed parts can be simplified.

Further, the elastically deformed parts 52, 53 and 55 each have the bowstring shape, and thus can be formed smaller than the through-hole 51, which reduces the size of the case 40 which rotatably supports the winding shaft 20.

Further, since the marks for assembling the elastically deformed parts 52, 53, and 55 in a fixed posture are provided on the outer surface of the case 40, it is easy to always keep the fixed posture of the elastically deformed parts 52, 53, and 55. Since the posture of the elastically deformed parts 52, 53 and 55 is always fixed, it is easy to dispose each of the elastically deformed parts 52, 53 and 55 at the fixed position with respect to the hinge door 92.

It is assumed that a force other than the force upon the end of the closing operation of the hinge door is applied to the winding shaft 20.

As such a force, for example, a force caused by vibration of the vehicle 90 during normal driving can be considered. The force caused by the vibration of the vehicle 90 during normal driving is a force that does not depend on a specific direction. Here, it is considered that the force caused by the vibration of the vehicle 90 during normal driving is smaller than the force applied to the winding shaft 20 upon the end of the closing operation. In this aspect, the outer peripheral portion of the winding shaft 20 is pressed toward the center by the elastically deformed parts 52, 53, and 55. Therefore, even if the force caused by vibration of the vehicle 90 during normal driving is applied to the winding shaft 20, it is possible to prevent the occurrence of rattling of the winding shaft 20 by the elastically deformed parts 52, 53, and 55, and to reduce the generation of unusual sounds.

As such a force, for example, a force caused by the drawing operation of the sheet-form member 12 is considered. The force caused by the drawing operation of the sheet-form member 12 is applied to the winding shaft 20 in a drawing direction of the sheet-form member 12. The drawing direction of the sheet-form member 12 is generally a direction intersecting with the opening and closing direction of the door, and may be, for example, an upper-lower direction on the paper in FIG. 6. Here, it is considered that the force applied to the winding shaft 20 due to the drawing operation of the sheet-form member 12 is smaller than the force applied to the winding shaft 20 upon the end of the closing operation. In this aspect, the outer peripheral portion of the winding shaft 20 is pressed toward the center by the elastically deformed parts 52, 53, and 55. Therefore, even if the force caused the drawing operation of the sheet-form member 12 is applied to the winding shaft 20, it is possible to prevent the occurrence of rattling of the winding shaft 20 by the elastically deformed parts 52, 53, and 55, and to reduce the generation of unusual sounds.

Modifications

Figure 8:
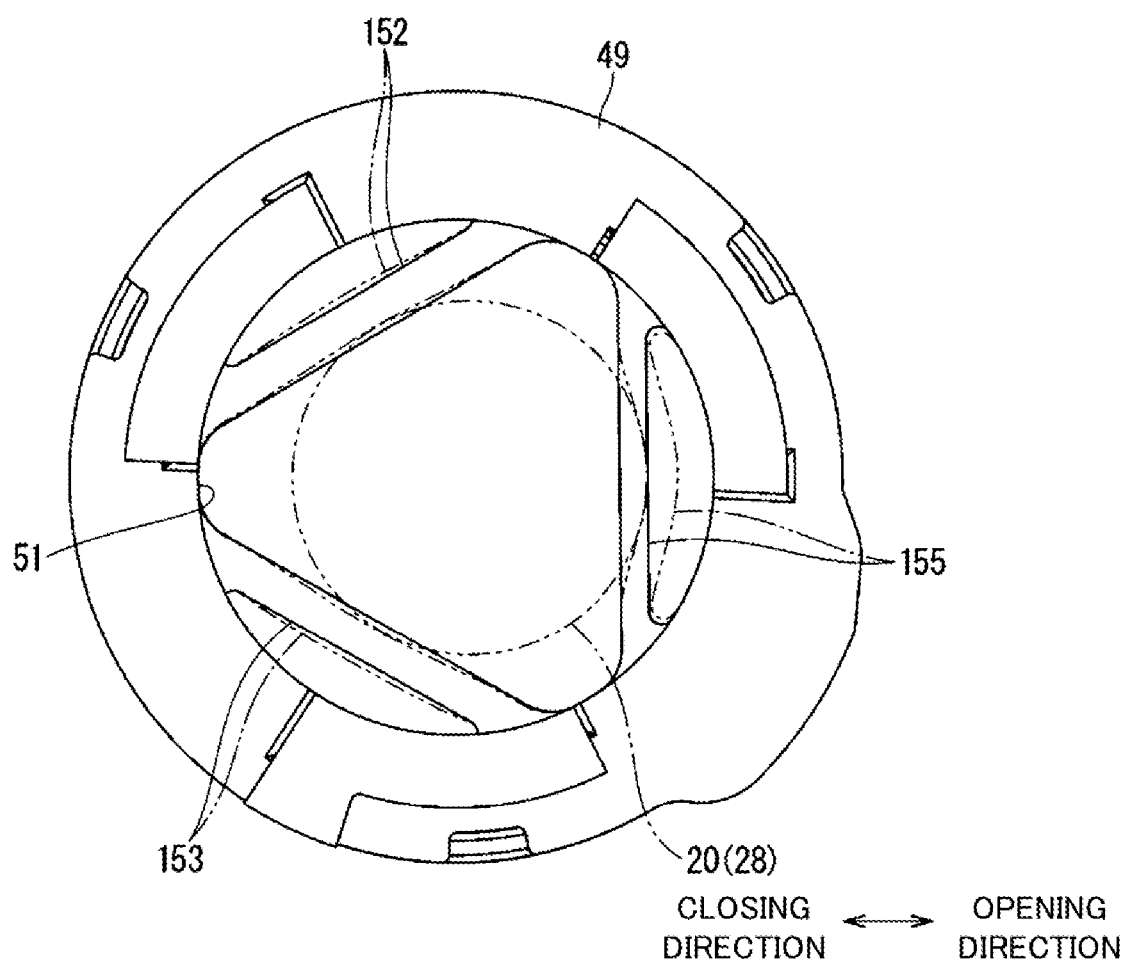
FIG. 8 is a side view illustrating a modification of the support member.

FIG. 8 is a side view showing a modification of the case 40. The two-dot chain line in FIG. 8 indicates the winding shaft 20 and the elastically deformed parts 152, 153, and 155 in a stationary state in which the winding shaft 20 is inserted.

In the embodiment, the deformation amount of the second elastically deformed part 55 in the stationary state due to the winding shaft 20 passing through the through-hole 51 is the same as the deformation amount of the first elastically deformed parts 52 and 53 in the stationary state due to the winding shaft 20 passing through the through-hole 51, which, however, is not necessarily needed. It can be considered that the deformation amount of the second elastically deformed part 55 in the stationary state due to the winding shaft 20 passing through the through-hole 51 is larger than the deformation amount of the first elastically deformed parts 52 and 53 in the stationary state due to the winding shaft 20 passing through the through-hole 51.

In order to change the deformation amount of the first elastically deformed parts 52 and 53 and the second elastically deformed part 55 in the stationary state due to the winding shaft 20 passing through the through-hole 51, it can be considered to change easiness of elastic deformation between the first elastically deformed parts 52 and 53 and the second elastically deformed part 55, for example. That is, in the embodiment, the first elastically deformed parts 52 and 53 and the second elastically deformed part 55 are formed in the same shape, but by forming the first elastically deformed parts 52 and 53 in a manner more difficult to elastically deform than the second elastically deformed part 55, the deformation amount of the second elastically deformed part 55 in the stationary state due to the winding shaft 20 passing through the through-hole 51 is can be set larger than the deformation amount of the first elastically deformed parts 52 and 53 in the stationary state due to the winding shaft 20 passing through the through-hole 51.

In the example illustrated in FIG. 8, a thickness dimension (dimension in the radial direction) of the first elastically deformed parts 152 and 153 is set larger than a thickness dimension of the second elastically deformed part 155, so that the first elastically deformed parts 152 and 153 are formed in a manner more difficult to elastically deform than the second elastically deformed part 155. Thus, as shown in FIG. 8, the deformation amount of the second elastically deformed part 155 in the stationary state due to the winding shaft 20 passing through the through-hole 51 is larger than the deformation amount of the first elastically deformed parts 152 and 153 in the stationary state due to the winding shaft 20 passing through the through-hole 51.

When the first elastically deformed parts 52 and 53 are to be formed in a manner more difficult to elastically deform than the second elastically deformed part 55, a configuration other than the above-described configuration may be employed. For example, a width dimension (dimension in the axial direction) of the first elastically deformed parts 52 and 53 may be larger than a width dimension of the second elastically deformed part 55, or an elastic member such as a spring or rubber may be provided in each gap space 51h between the intermediate portions of the first elastically deformed parts 52 and 53 and the inner peripheral surface of the through-hole 51.

In this way, the deformation amount of the second elastically deformed part 155 in the stationary state is larger than the deformation amount of the first elastically deformed parts 152 and 153, so that the movement amount of the second elastically deformed part 155 upon elastic recovery increases. Therefore, upon the end of the closing operation of the hinge door 92, even if the movement amount of the winding shaft 20 after inertial movement is large, the second elastically deformed part 155 can easily follow the winding shaft 20 to the end.

In addition, in the embodiment, the plurality of elastically deformed parts 52, 53, and 55 include two first elastically deformed parts 52 and 53 and one second elastically deformed part 55, which, however, is not necessarily needed. For example, the plurality of elastically deformed parts may include three or more first elastically deformed parts. For example, the plurality of elastically deformed parts may include a plurality of second elastically deformed parts. For example, the plurality of elastically deformed parts may not include the second elastically deformed part. For example, when the plurality of elastically deformed parts include the first elastically deformed part and the second elastically deformed part, the number of the first elastically deformed parts may be larger or smaller than the number of the second elastically deformed parts, or the number of the first elastically deformed parts and the number of the second elastically deformed parts may be the same.

In the embodiment, the movement amount by which the winding shaft 20, which is to move under inertia upon the end of the closing operation of the hinge door 92, moves under inertia while elastically deforming the first elastically deformed parts 52, 53 in the closing direction is smaller than the deformation amount of the second elastically deformed part 55 in the opening direction in the stationary state due to the winding shaft 20 passing through the through-hole 51, which, however, is not necessarily needed. The movement amount by which the winding shaft 20, which is to move under inertia upon the end of the closing operation of the hinge door 92, moves under inertia while elastically deforming the first elastically deformed parts 52, 53 in the closing direction may be set equal to or larger than the deformation amount of the second elastically deformed part 55 in the opening direction in the stationary state due to the winding shaft 20 passing through the through-hole 51. In this case as well, the gap between the second elastically deformed part 55 and the winding shaft 20 can be reduced by due to elastic recovery of the second elastically deformed part 55.

In addition, in the embodiment, the elastically deformed parts 52, 53, and 55 are each formed in the bowstring shape connecting two different points in the circumferential direction on the inner peripheral surface of the through-hole 51, which, however, is not necessarily needed. For example, when the elastically deformed parts 52, 53, and 55 are integrally formed with the case 40, the elastically deformed parts 52, 53, and 55 may be formed in a cantilever shape protruding inward from the inner peripheral surface of the through-hole 51. As the elastically deformed parts 52, 53, and 55, for example, elastic members may be provided separately from the case 40.

In the embodiment, the support member 40 is described as the case 40 that houses the biasing member S, which, however, is not necessarily needed. It can also be considered that the support member is formed in a shape that does not house the biasing member. In this case, the biasing member is, for example, formed in a coil spring shape, and is disposed in a hollow portion of the winding shaft 20.

The configurations described in the above embodiment and modifications can be combined as appropriate as long as they do not contradict each other.

Although the present invention has been described in detail above, the above description is illustrative in all aspects and the present invention is not limited thereto. It is to be understood that numerous variations that are not illustrated can be conceived without departing from the scope of the present invention.

REFERENCE SIGNS LIST

10 winding shade device
12 sheet-form member
20 winding shaft
22 shaft main body
24 bearing
25 fitting portion
28 penetrating portion
29 flange portion
30 attachment portion
40 case (support member)
42 housing member
45 end housing portion (second mark)
48 lid member
49 lid portion (wall portion)
51 through-hole
52, 53 first elastically deformed part (elastically deformed part)
55 second elastically deformed part (elastically deformed part)
63 third overhang portion (first mark)
70 frame
90 vehicle
92 hinge door
S biasing member

The invention claimed is:

1. A winding shade device attached to a hinge door of a vehicle, the winding shade device comprising:
a sheet-form member;
a winding shaft having an outer peripheral portion to which one end of the sheet-form member is attached, the winding shaft being configured to be biased in a direction in which the sheet-form member is wound; and
a support member configured to be fixed to the hinge door, the support member including:
a wall portion formed with a through-hole through which an end portion of the outer peripheral portion of the winding shaft passes; and
a plurality of elastically deformed parts extending inwardly from an inner peripheral surface of the through-hole, the plurality of elastically deformed parts pressing and rotatably supporting the end portion of the winding shaft passed through the through-hole,
wherein the plurality of elastically deformed parts include a plurality of first elastically deformed parts disposed in a closing direction of the hinge door relative to a center of the winding shaft, the plurality of first elastically deformed parts being disposed in line symmetry with respect to a line that passes through a center of the through-hole and that extends in an opening and closing direction of the hinge door, and
the elastically deformed parts are each formed in a bowstring shape connecting two different points in a circumferential direction on the inner peripheral surface of the through-hole.

2. The winding shade device according to claim 1, wherein the plurality of elastically deformed parts further include at least one second elastically deformed part disposed in an opening direction of the hinge door relative to the center of the winding shaft.

3. The winding shade device according to claim 2, wherein a movement amount of the winding shaft by which the winding shaft, which is to move under inertia upon an end of a closing operation of the hinge door, moves under inertia while elastically deforming the first elastically deformed parts in the closing direction is smaller than a deformation amount of the second elastically deformed part in the opening direction in a stationary state due to the winding shaft passing through the through-hole.

4. The winding shade device according to claim 2, wherein a deformation amount of the second elastically deformed part in the opening direction in a stationary state due to the winding shaft passing through the through-hole is larger than a deformation amount of the first elastically deformed parts in the closing direction in the stationary state due to the winding shaft passing through the through-hole.

5. The winding shade device according to claim 2, wherein the plurality of elastically deformed parts consist of two first elastically deformed parts and one second elastically deformed part.

6. The winding shade device according to claim 1, wherein a mark for assembling the elastically deformed parts in a fixed posture is provided on an outer surface of the support member.

\* \* \* \* \*